United States Patent
Sewall et al.

(10) Patent No.: US 8,651,799 B2
(45) Date of Patent: Feb. 18, 2014

(54) TURBINE NOZZLE SLASHFACE COOLING HOLES

(75) Inventors: Evan Andrew Sewall, Simpsonville, SC (US); James William Vehr, Easley, SC (US); Frederic Woodrow Roberts, Jr., Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 13/151,564

(22) Filed: Jun. 2, 2011

(65) Prior Publication Data

US 2012/0308399 A1     Dec. 6, 2012

(51) Int. Cl.
*F01D 9/06*     (2006.01)
*F01D 5/14*     (2006.01)

(52) U.S. Cl.
USPC .............. 415/1; 415/115; 415/139; 416/1; 416/95; 416/97 R; 416/193 A

(58) Field of Classification Search
USPC ........... 415/1, 115, 116, 138, 139; 416/1, 95, 416/96 R, 96 A, 97 R, 193 A
See application file for complete search history.

(56) References Cited

U.S. PATENT DOCUMENTS

| | | | |
|---|---|---|---|
| 6,276,897 B1 * | 8/2001 | Tarada | 416/97 R |
| 6,290,459 B1 * | 9/2001 | Correia | 415/139 |
| 6,517,312 B1 | 2/2003 | Jones et al. | |
| 6,609,880 B2 | 8/2003 | Powis et al. | |
| 6,969,233 B2 | 11/2005 | Powis et al. | |
| 7,008,178 B2 | 3/2006 | Busch et al. | |
| 7,140,835 B2 | 11/2006 | Lee et al. | |
| 7,377,743 B2 | 5/2008 | Flodman et al. | |
| 7,416,391 B2 | 8/2008 | Veltre et al. | |
| RE40,658 E | 3/2009 | Powis et al. | |
| 7,581,401 B2 | 9/2009 | West et al. | |
| 7,600,972 B2 * | 10/2009 | Benjamin et al. | 416/97 R |
| 7,836,703 B2 | 11/2010 | Lee et al. | |
| 2007/0031240 A1 | 2/2007 | Nichols et al. | |
| 2009/0269184 A1 * | 10/2009 | Spangler et al. | 415/115 |
| 2010/0322767 A1 * | 12/2010 | Nadvit et al. | 416/1 |

* cited by examiner

*Primary Examiner* — Christopher Verdier
(74) *Attorney, Agent, or Firm* — Nixon & Vanderhye, P.C.

(57) ABSTRACT

A turbine vane or blade segment includes at least one airfoil extending radially outwardly from a radially inner band. A plurality of cooling passages are formed in the radially inner band in fluid communication with an internal plenum in the airfoil and exiting the inner band via a plurality of exit holes in the one of the axially-extending side edges of the inner band. The plurality of exit holes are confined to a region along the one of the axially-extending side edges where static pressure $P_S$ along the one of the substantially axially-extending side edges lies in a pressure range substantially between the stage inlet total pressure $P_T$ and a pressure that is substantially about 1.5 times the dynamic pressure range $\Delta P_D$, below the stage inlet total pressure.

20 Claims, 4 Drawing Sheets

TURBINE NOZZLE SLASHFACE COOLING HOLES

BACKGROUND AND SUMMARY OF THE INVENTION

The present invention relates generally to turbomachines and more particularly to vane and blade assemblies utilized in the high pressure turbine section of gas turbine engines.

It is desirable to operate a gas turbine engine at high temperatures most efficient for generating and extracting energy from the combustion gases. Certain components of the gas turbine engine, for example, stationary vane segments of a turbine stator assembly which closely surround the turbine rotor and which define the outer boundary for the hot combustion gases flowing through the turbine, are directly exposed to the heated stream of combustion gases. The vane segments typically incorporate one, two or more individual vanes or airfoils extending between inner and outer bands or shrouds.

It has been determined that there is the potential for significant increases in temperature on the sidewalls of the vane segments, due to a lack of cooling air sweeping over the intersegment gap between two adjacent vane segments. Instead of cooling air, hot combustion gas is forced into the "chute" above the intersegment seal in the gap between adjacent vane segments. The combustion gas heats the edges of the vane segment inner (or outer) shroud or band on two faces i.e., the forward edge of the segment and an adjacent side edge. The most problematic is the vane segment side edge, or slashface, closest to the leading edge of one of the vane segment airfoils, where combustion gas pressure is highest. The concentrated heat load can potentially result in oxidation, cracking and burning, often resulting in irreparable damage to the nozzle or vane segment.

The current accepted solution to this problem is to pressurize the entire nozzle diaphragm so as to force enough cooling air into the chute region to purge any resident hot gases. This option, however, significantly degrades performance of the turbine engine due to the diversion of relatively large amounts of compressor discharge air to pressurize the nozzle diaphragm.

There remains a need, therefore, for a solution that does not degrade turbine engine performance, and which is comparatively simple and less expensive than current solutions.

BRIEF SUMMARY OF THE INVENTION

Accordingly, in a first exemplary but nonlimiting embodiment, there is provided a turbine vane segment comprising at least one airfoil extending radially outwardly from a radially inner band, the radially inner band formed with substantially axially-extending side edges; the at least one airfoil formed with a leading edge, a trailing edge, a pressure side and a suction side; the pressure side facing one of the substantially axially-extending edges and the leading edge located proximate to the one of the substantially axially-extending edges; and a plurality of cooling passages formed in the radially inner band in fluid communication with a source of cooling air and exiting the inner band via a plurality of exit holes in the one of the substantially axially-extending edges, the plurality of exit holes confined to a region along the one of the substantially axially-extending side edges where static pressure $P_S$ along the one of the substantially axially-extending side edges lies in a pressure range, substantially between the stage inlet total pressure, PT, and a pressure that is substantially about 1.5 times the dynamic pressure range, $\Delta P_D$, below the stage inlet total pressure. The dynamic pressure range is defined as the difference between the stage inlet total pressure and the stage inlet static pressure as defined by a standard isentropic dynamic head equation as a function of stage inlet Mach number.

In another exemplary but nonlimiting aspect, there is provided a method of cooling a gap between inner bands of a pair of adjacent vane segments of a stator assembly surrounding a rotor wherein each vane segment includes at least one airfoil extending between radially inner and outer bands, at least the radially inner band formed with substantially axially-extending side edges; the airfoil formed with a leading edge, a trailing edge, a pressure side and a suction side, and an internal cooling plenum; the pressure side facing one of the substantially axially-extending side edges and the leading edge located proximate to the one of the substantially axially-extending side edges; the method comprising identifying a length portion of the one of the substantially axially-extending side edges of the radially inner or outer bands where static pressure $P_S$ along the one of the substantially axially-extending side edges lies in a pressure range, substantially between the total stage inlet pressure $P_T$ and a pressure that is substantially about 1.5 times the dynamic pressure range below the total stage inlet pressure; and supplying cooling air to the gap along one of the substantially axially-extending side edges at locations only in the identified length portion.

In still another exemplary but nonlimiting aspect, there is provided a method of a method of cooling a gap between inner bands of a pair of blade segments of a rotor assembly wherein each blade segment includes one airfoil extending radially outward from the radially inner band, the radially inner band formed with substantially axially-extending side edges; the airfoil formed with a leading edge, a trailing edge, a pressure side and a suction side; the pressure side facing one of the substantially axially-extending edges and the leading edge located proximate to the one of the substantially axially-extending edges; the method comprising identifying a length portion of the one of the substantially axially-extending side edges of the radially inner band where static pressure $P_s$ along the one of the substantially axially-extending side edges lies in a pressure range, substantially between the stage inlet total pressure $P_T$ and a pressure that is substantially about 1.5 times the dynamic pressure $\Delta P_D$ below the stage inlet total pressure; and supplying cooling air to the gap along one of the substantially axially-extending side edges at locations only in the identified length portion.

The invention will now be described in detail in connection with the drawings identified below.

DETAILED DESCRIPTION OF THE INVENTION

Figure 1:
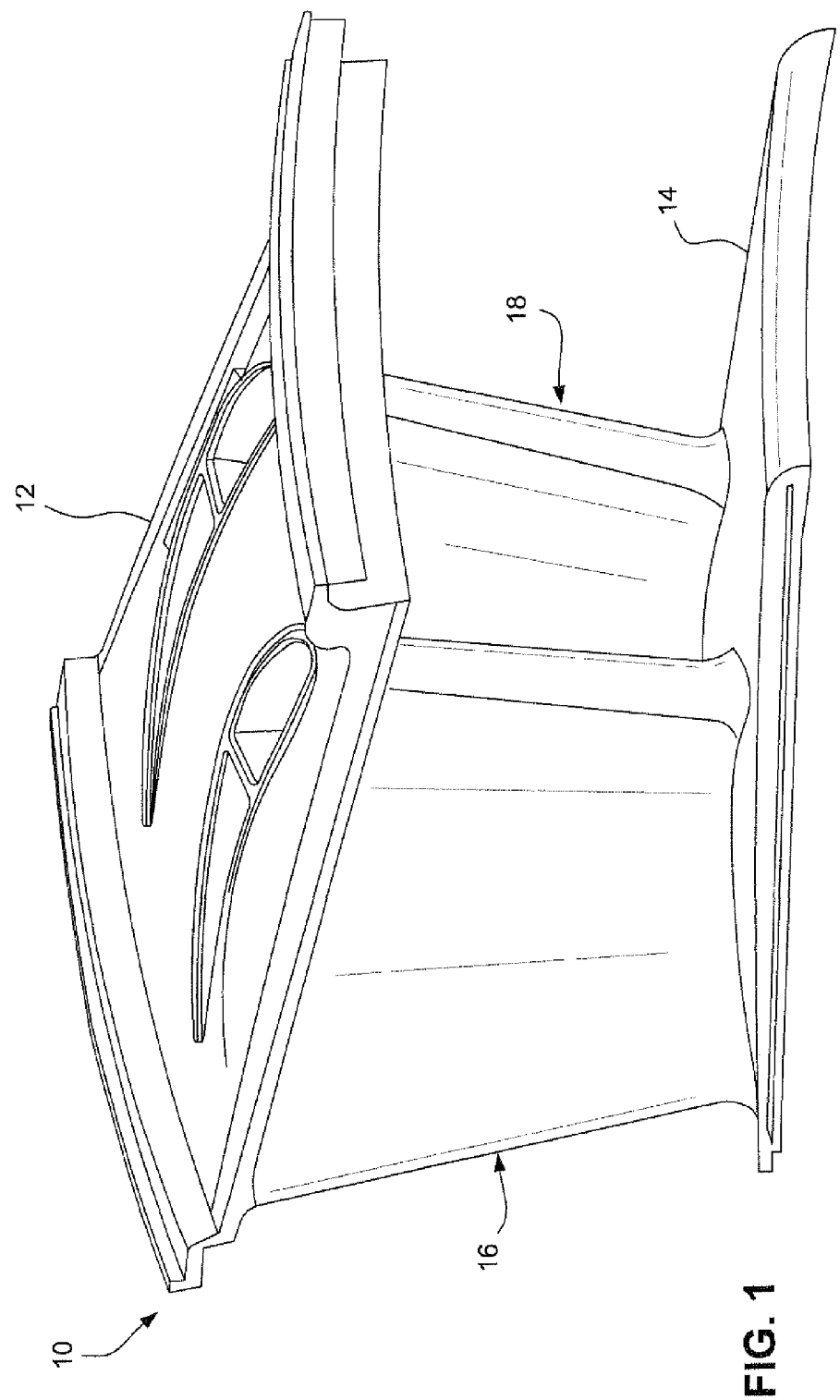
FIG. 1 is a perspective view of a gas turbine nozzle segment, including radially inner and outer bands.

With reference especially to FIGS. 1-4, a turbine vane segment 10 includes a radially outer band or shroud 12 and a radially inner band or shroud 14. Between the inner and outer bands, there is a pair of airfoils 16 and 18 (a two-airfoil segment is sometimes referred to as a "doublet"). Other vane segments may have one or more than two individual airfoils, and the invention here is not limited to any particular number of airfoils in the vane segment. The airfoils 16 and 18 are substantially identical with the exception of their orientation relative to the inner and outer bands. Accordingly, and with reference especially to FIG. 3, it may be seen that the blade or airfoil 16 has a leading edge 20, a trailing edge 22, a pressure side 24 and a suction side 26.

Figure 2:
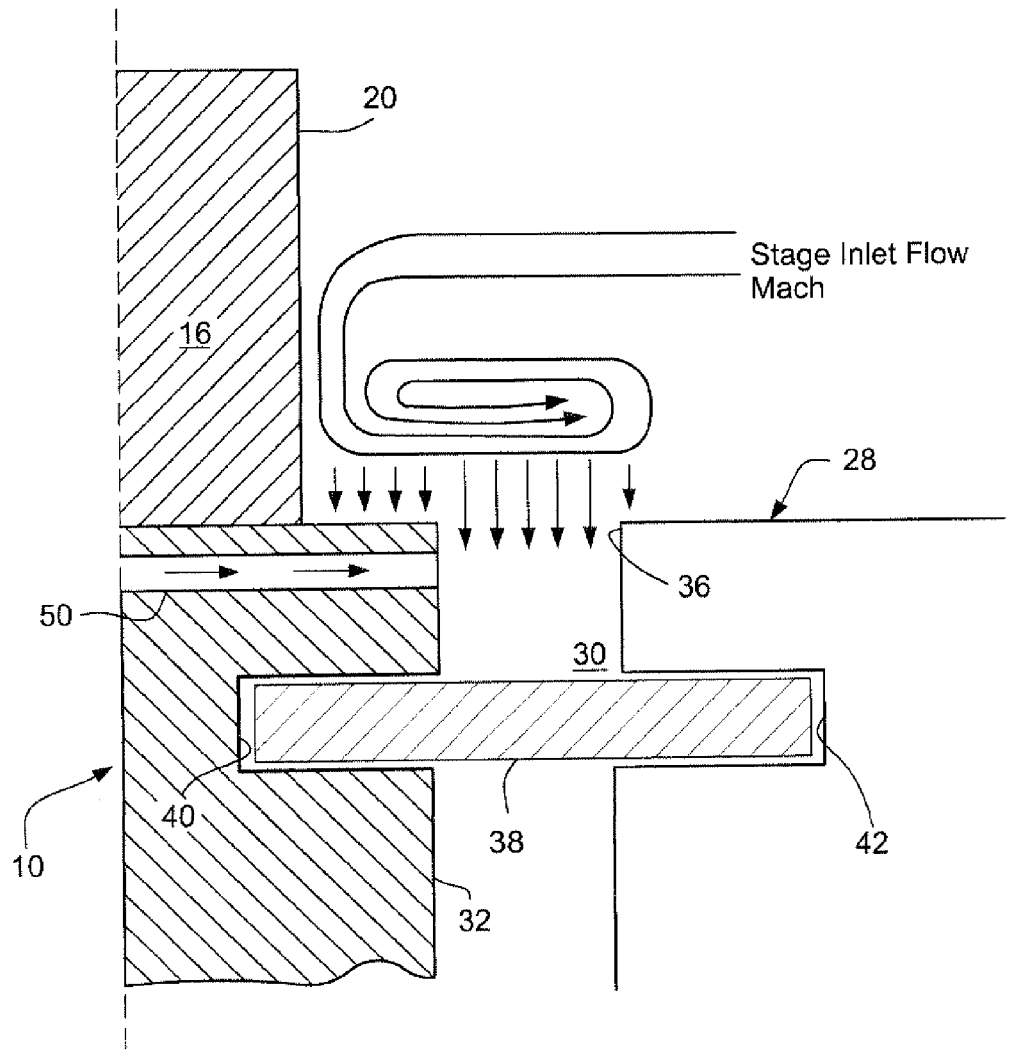
FIG. 2 is a schematic representation of adjacent segments with cooling of a chute region between adjacent nozzle segments in accordance with an exemplary but nonlimiting embodiment.
Figure 3:
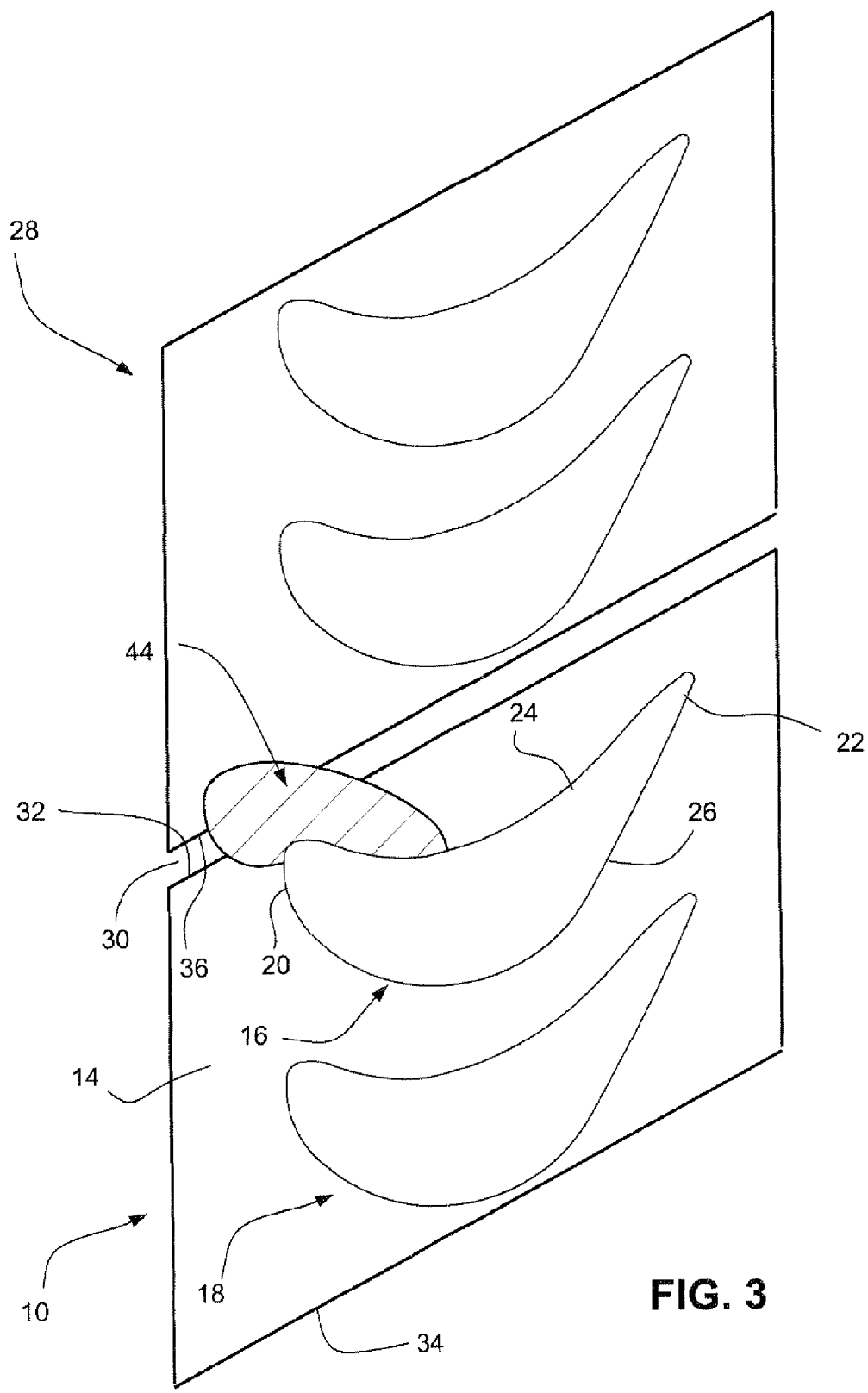
FIG. 3 is a schematic plan view of adjacent nozzle segments illustrating a maximum pressure field along the radially inner band of the segment.

The individual arcuate vane segments 10 are arranged in a stationary, annular array about the turbine rotor as is well understood in the art. FIGS. 2 and 3 show a pair of vane segments 10 and 28 as they would appear in an installed state, with a gap 30 extending substantially axially therebetween. The substantially axially-extending side edges 32 and 34 of the segment 10 are referred to as slashfaces. Thus, slashface 32 of the segment 10 and slashface 36 of the segment 28 are opposed to each other and define the gap 30, also referred to herein as the "chute" or "chute region".

It will be appreciated from the orientation of the airfoils 16 and 18 relative to the inner band 14, that the leading edge 20 of the airfoil 16 lies in relatively close proximity to the slashface 32. Generally, it is the region along the slashface 32 and proximate the leading edge of one of the two airfoils in the segment that experiences a local maximum static pressure as the hot combustion gases flow from the combustor into the turbine stages. In this case, it is the slashface 32 proximate leading edge 20 of airfoil 16 that experiences the highest range of combustion gas pressures.

In the exemplary but nonlimiting embodiment, and as best seen in FIG. 3, cooling passages may be formed to exit from the slashface 32 of vane segment 10 and/or the slashface 36 of the adjacent vane segment 28 as described further herein. The chute 30 can be seen clearly between the opposed slashfaces 32, 36 of respective segments 10, 28, and the radial depth of the chute 30 is defined by the location of an intersegment seal 38 (FIG. 2) seated in respective slots 40, 42 and extending axially along the adjacent slashfaces 32, 36.

As already noted, with the airfoil leading edge 20 located proximate the slashface 32, localized high pressure may be experienced in the chute 30 (see FIGS. 2 and 3) along a limited portion of the axial length of the slashface 32. In accordance with an exemplary but nonlimiting embodiment of this invention, the chute 30 is supplied with cooling air that is focused or concentrated only on the high pressure region 44 of the slashface 32. In this regard, attention is directed specifically to FIG. 3 where the high pressure region 44 is schematically shown at the leading edge 20, and extending partially along the pressure side 24 of the airfoil 16, and with a fairly well-defined high pressure area along the slashface 32. The range of high pressures determined to be potentially damaging to the slashface 32 and hence the entire vane segment 10, is within certain boundaries along the slashface as defined below. By supplying cooling air to the chute 30 at just the region subjected to the predetermined high pressure range, it is possible to substantially neutralize the potential damage to the nozzle segment along the slashface 32.

Figure 5:
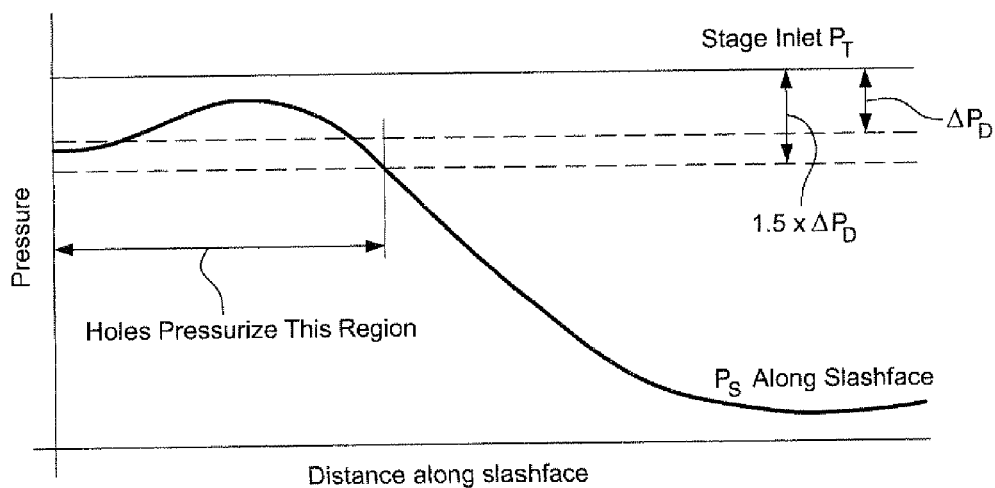
FIG. 5 is a plot showing the stage inlet total pressure $P_T$ and the range of pressure between the stage inlet total pressure and a pressure that is 1.5 times the dynamic pressure value $\Delta P_D$ below the stage inlet total pressure.

In the exemplary embodiment, and with reference to the pressure plot shown in FIG. 5, identification of the high pressure region along the slashface 32 to be cooled can be determined by calculating total pressure $P_T$ and Mach number M at the inlet to the turbine stage; static pressure $P_S$ along the slashface 32; and dynamic pressure $\Delta P_D$ which is defined as $P_T$-$P_S$ at the stage inlet, which can be calculated by standard isentropic flow equations as a function of stage inlet total pressure and stage inlet Mach number. As can be seen in FIG. 5, the highest pressures along the slashface 32 lie in a region where static pressure $P_S$ along said one of said substantially axially-extending side edges lies in a pressure range $\Delta P$ substantially between the stage inlet total pressure $P_T$ and a pressure that is substantially about 1.5 times the dynamic pressure range $\Delta P_D$ below the stage inlet total pressure.

Figure 4:
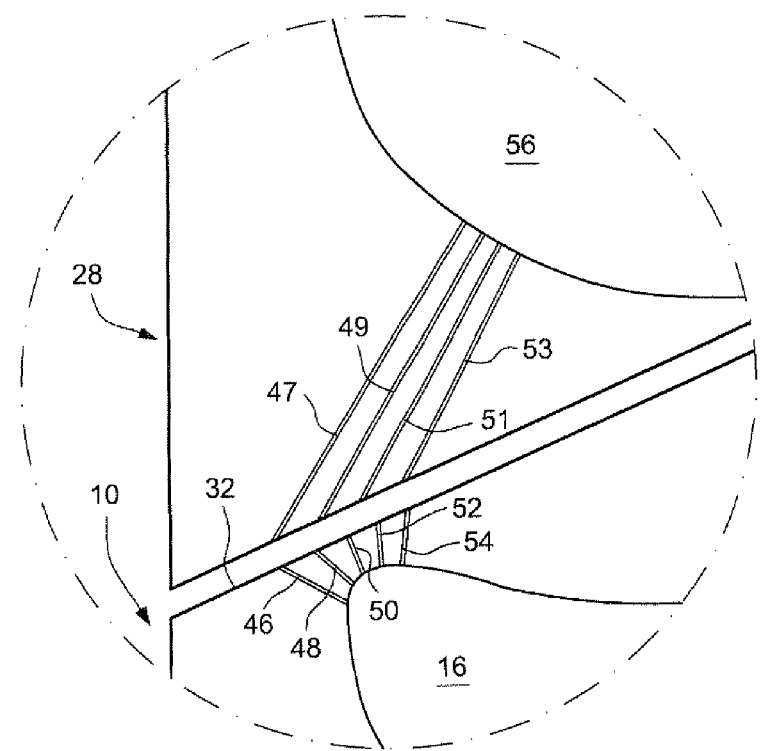
FIG. 4 is a schematic plan view of cooling passage arrangements in adjacent vane segments for cooling a high pressure region of an inner band slashface of the segment.

With reference now to FIG. 4, a plurality of cooling passages 46, 48, 50, 52 and 54 extend through the inner band 14 of either airfoil adjacent to the chute gap from an internal plenum provided within the airfoil 16 to the slashface 32. Alternatively, cooling passages 47, 49, 51 and 53 could extend to the chute 30 from a plenum (not shown) in airfoil 56 in the adjacent vane segment 28. In still another alternative arrangement, cooling air could be supplied from both sets of cooling passages, or from any other available source.

Thus, the forward and aft cooling passages 46 and 54 at the forward and aft ends of the plural passages exit the slashface 32 at substantially the length-wise boundaries of the high pressure region 44. By utilizing cooling air supplied from the airfoil plenum, the hot combustion gas in the chute 30 is partially prevented from entering the chute by mixing the cooling air with the combustion gas, and the slashface 32 (particularly in the high pressure region 44) is exposed to cooler air. In addition, the cooling air flowing through the passages 46, 48, 50, 52 and 54 has a further beneficial effect in that they cool the inner band 14 by convective cooling.

It will be appreciated that because different turbine models and stages within those models will incorporate various vane segment designs, it is not possible to describe in any generic, structural sense, exactly where the region of high pressures will occur. Nevertheless, for a given turbine model/turbine stage, the ordinarily skilled worker in the art can determine where regions of high pressure occur, and can also determine not only the location of maximum pressure, but also the location of a range of pressures that are considered potentially harmful. By defining the region R as explained above, it is possible to generate pressure data for other models and other stages, with cooling schemes implemented accordingly so as to adequately protect the slashface nearest the region of maximum gaspath pressure.

It should also be understood that the invention is not limited to utilization along a single edge of the inner band, but is also applicable to either or both of inner and outer bands. In addition, the invention has applicability not only to stationary vane segments but also to rotating buckets on rotor wheels located between the vane stages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine vane or blade segment comprising at least one airfoil extending radially outwardly from a radially inner band, said radially inner band formed with substantially axially-extending side edges; said at least one airfoil formed with a leading edge, a trailing edge, a pressure side and a suction side; said pressure side facing one of said substantially axially-extending side edges and said leading edge located proximate to said one of said substantially axially-extending side edges; and a plurality of cooling passages formed in said radially inner band in fluid communication with a source of cooling air and exiting said inner band via a plurality of exit holes in said one of said substantially axially-extending side edges, said plurality of exit holes confined to a region where static pressure $P_S$ along said one of said substantially axially-extending side edges lies in a pressure range substantially between the stage inlet total pressure $P_T$ and a pressure that is substantially about 1.5 times the dynamic pressure $\Delta P_D$ below the stage inlet total pressure.

2. The turbine vane or blade segment of claim 1 wherein said plurality of cooling passages originate at said leading edge and fan out to said plurality of exit holes.

3. The turbine vane or blade segment of claim 2 wherein first and second marginal ones of said plurality of cooling passages extend to lengthwise boundaries of said region.

4. The turbine vane or blade segment of claim 1 wherein said at least one airfoil comprises a pair of airfoils including said at least one airfoil and an adjacent second airfoil proximate the other of said substantially axially-extending edges, a pressure side and a leading edge of said second airfoil facing away from the other of said substantially axially-extending side edges.

5. The turbine vane or blade segment of claim 4 wherein there are no cooling passages in said inner band exiting along said other of said substantially axially-extending side edges.

6. The turbine vane or blade segment of claim 1 wherein there are no cooling passages in said inner band exiting along said other of said substantially axially-extending side edges.

7. The turbine vane segment of claim 1 wherein said turbine vane or blade segment is adapted for attachment to a turbine rotor assembly.

8. A method of cooling a gap between inner or outer bands of a pair of vane segments of a stator assembly surrounding a rotor wherein each vane segment includes at least one airfoil extending between radially inner and outer bands, said radially inner and outer bands formed with substantially axially-extending side edges; said airfoil formed with a leading edge, a trailing edge, a pressure side and a suction side; said pressure side facing one of said substantially axially-extending edges and said leading edge located proximate to said one of said substantially axially-extending edges; the method comprising:
(a) identifying a length portion of said one of said substantially axially-extending side edges of said radially inner or outer bands where region where static pressure $P_S$ along said one of said substantially axially-extending side edges lies in a pressure range, substantially between the stage inlet total pressure $P_T$ and a pressure that is substantially about 1.5 times the dynamic pressure $\Delta P_D$ below the stage inlet total pressure; and
(b) supplying cooling air to said gap along one of said substantially axially-extending side edges at locations only in the identified length portion.

9. The method of claim 8 wherein (b) is carried out by supplying cooling air from a plenum internal to said airfoil.

10. The method of claim 9 wherein (b) is further carried out by providing plural cooling passages in communication with said plenum and extending from said leading edge and fanning outwardly to said one of said substantially axially-extending side edges.

11. The method of claim 8 wherein said step (b) is carried out only with respect to said one of said substantially axially-extending side edges of said inner band.

12. The method of claim 10 wherein forward and aft passages of said plural cooling passages exit said one of said substantially axially-extending side edges at forward and aft boundaries of said length portion.

13. The method of claim 10 wherein there are no cooling passages in said inner or outer band exiting along said other of said substantially axially-extending side edges.

14. The method of claim 8 wherein said gap has a radial depth defined by a seal extending between the pair of adjacent vane segments.

15. A method of cooling a gap between radially inner bands of a pair of blade segments of a rotor assembly wherein each blade segment includes one airfoil extending radially outward from the radially inner band, said radially inner band formed with substantially axially-extending side edges; said airfoil formed with a leading edge, a trailing edge, a pressure side and a suction side; said pressure side facing one of said substantially axially-extending edges and said leading edge located proximate to said one of said substantially axially-extending edges; the method comprising:
(a) identifying a length portion of said one of said substantially axially-extending side edges of said radially inner band where static pressure $P_S$ along said one of said substantially axially-extending side edges lies in a pressure range, substantially between the stage inlet total pressure $P_T$ and a pressure that is substantially about 1.5 times the dynamic pressure $\Delta P_D$ below the stage inlet total pressure; and
(b) supplying cooling air to said gap along one of said substantially axially-extending side edges at locations only in the identified length portion.

16. The method of claim 15 wherein (b) is carried out by supplying cooling air from a plenum internal to said airfoil.

17. The method of claim 16 wherein (b) is further carried out by providing plural cooling passages in communication with said plenum and extending from said leading edge and fanning outwardly to said one of said substantially axially-extending side edges.

18. The method of claim 15 wherein said step (b) is carried out only with respect to said one of said substantially axially-extending side edges of said inner band.

19. The method of claim 17 wherein forward and aft passages of said plural cooling passages exit said one of said substantially axially-extending side edges at forward and aft boundaries of said length portion.

20. The method of claim 15 wherein said gap has a radial depth defined by a seal extending between the pair of adjacent blade segments.

* * * * *

UNITED STATES PATENT AND TRADEMARK OFFICE
CERTIFICATE OF CORRECTION

| | |
|---|---|
| PATENT NO. | : 8,651,799 B2 |
| APPLICATION NO. | : 13/151564 |
| DATED | : February 18, 2014 |
| INVENTOR(S) | : Sewall et al. |

It is certified that error appears in the above-identified patent and that said Letters Patent is hereby corrected as shown below:

In the Claims:

In Claim 8 at column 5, line 51, delete "region where" after --outer bands where--

Signed and Sealed this
Sixth Day of May, 2014

Michelle K. Lee
*Deputy Director of the United States Patent and Trademark Office*